United States Patent
Vaananen

(10) Patent No.: US 11,410,256 B2
(45) Date of Patent: Aug. 9, 2022

(54) LEGAL DOCUMENT FILING SYSTEM

(71) Applicant: Mikko Vaananen, Helsinki (FI)

(72) Inventor: Mikko Vaananen, Helsinki (FI)

(73) Assignee: Mikko Vaananen, Helsinki (FI)

( * ) Notice: Subject to any disclaimer, the term of this patent is extended or adjusted under 35 U.S.C. 154(b) by 0 days.

(21) Appl. No.: 17/009,061

(22) Filed: Sep. 1, 2020

(65) Prior Publication Data

US 2020/0402189 A1    Dec. 24, 2020

Related U.S. Application Data

(62) Division of application No. 15/412,087, filed on Jan. 23, 2017, now Pat. No. 10,796,389.

(60) Provisional application No. 62/292,901, filed on Feb. 9, 2016.

(51) Int. Cl.

| | |
|---|---|
| *G06Q 50/18* | (2012.01) |
| *G06F 16/93* | (2019.01) |
| *G06Q 20/40* | (2012.01) |
| *G06Q 10/00* | (2012.01) |
| *G06Q 10/06* | (2012.01) |
| *G06F 40/58* | (2020.01) |
| *G06F 40/174* | (2020.01) |
| *G06Q 10/10* | (2012.01) |
| *G06Q 20/14* | (2012.01) |
| *G06Q 50/00* | (2012.01) |

(52) U.S. Cl.
CPC ........... *G06Q 50/184* (2013.01); *G06F 16/93* (2019.01); *G06F 40/174* (2020.01); *G06F 40/58* (2020.01); *G06Q 10/00* (2013.01); *G06Q 10/06* (2013.01); *G06Q 10/10* (2013.01); *G06Q 20/14* (2013.01); *G06Q 20/405* (2013.01); *G06Q 50/01* (2013.01)

(58) Field of Classification Search
USPC ...................................... 705/35, 39
See application file for complete search history.

(56) References Cited

U.S. PATENT DOCUMENTS

| | | | |
|---|---|---|---|
| 6,694,315 | B1 | 2/2004 | Grow |
| 7,016,851 | B1 | 3/2006 | Lee |
| 8,171,390 | B1 * | 5/2012 | Channakeshava .... G06F 40/174 |
| | | | 715/205 |
| 8,381,087 | B1 | 2/2013 | Hickman et al. |
| 9,195,845 | B2 | 11/2015 | Ginter et al. |
| 2001/0049707 | A1 | 12/2001 | Tran |

(Continued)

FOREIGN PATENT DOCUMENTS

WO    03098518 A2    11/2003

OTHER PUBLICATIONS

Extended European Search Report dated May 16, 2019 in European Patent Application No. 17749920.9.

(Continued)

*Primary Examiner* — William E Rankins

(57) ABSTRACT

The invention relates to field of filing legal documents via the cloud (100, 130).

The best mode of this invention is considered to be cloud based internet filing and storage system of legal documents that allows the user to compose and file documents, based on computer generated attorney instructions, forms and letter templates, without actually hiring an attorney.

The invention has the advantage of providing legally correct advice at an affordable price to the end customer in multiple jurisdictions and substantive fields at once.

18 Claims, 7 Drawing Sheets

(56) References Cited

U.S. PATENT DOCUMENTS

| | | | |
|---|---|---|---|
| 2003/0163492 A1* | 8/2003 | Slifer | G06F 16/93 |
| 2006/0089915 A1* | 4/2006 | Kantholy | G06F 21/10 |
| | | | 705/57 |
| 2007/0129987 A1* | 6/2007 | Hauser | G06Q 20/405 |
| | | | 705/342 |
| 2008/0172239 A1 | 7/2008 | Henderson et al. | |
| 2011/0196827 A1 | 8/2011 | Zunger | |
| 2014/0214503 A1 | 7/2014 | Chircorian | |
| 2014/0317000 A1 | 10/2014 | Lundberg et al. | |
| 2016/0111007 A1* | 4/2016 | Dennerline | G01C 21/20 |
| | | | 701/528 |

OTHER PUBLICATIONS

International Search Report & Written Opinion dated Apr. 20, 2017 in International PCT Application No. PCT/FI2017/050033.

* cited by examiner

LEGAL DOCUMENT FILING SYSTEM

CROSS REFERENCE TO RELATED APPLICATION

This application is a division of application Ser. No. 15/412,087 filed on Jan. 23, 2017, currently pending which is claiming priority from U.S. Provisional Application No. 62/292,901 filed on Feb. 9, 2016. The entire content of the above-identified application is hereby incorporated by reference.

TECHNICAL FIELD OF INVENTION

The invention relates to a cloud based method of filing legal documents.

In particular, the invention relates to field of filing patent application documents through the cloud storage system with different patent offices. In particular, the invention helps the inventors/organizations to file the patent applications without the help of foreign agent or with very little help from the foreign agent which in turn will save lot of money.

The inventive technical principle can be applied to other international legal fields to obtain similar efficiency improvements, that are high especially for consumers, small businesses or other smaller parties.

BACKGROUND

The world has become a more globalized complex place, and attorneys are in high demand and cost a lot of money to the public.

For example, nowadays, the inventors/organizations tend to file patent applications in many countries. They don't restrict themselves to only one country. To file the patent application in other jurisdictions, they hire foreign agents to file the application on their behalf who in turn charge them large amounts of money in addition to the official PTO fees. Similarly, in their home country, a lot of the filings could in reality be done without an attorney, should the inventor/organization have the necessary educational/instructive material at hand.

The situation is the same with almost any need that a small globalised company/individual may have. Company registrations, tax statements, employment law, almost all of these fields have standard solutions that fit 99% of the parties, but yet people still choose to hire attorneys, because they find it difficult to carry out these tasks with the instructions that are available from the Internet by themselves.

One prior art document U.S. Pat. No. 9,195,845 is describing prior art methods of how documents are exchanged very securely in multiple ways that are applicable in attorney client communication and is cited here as reference. The prior art does not tell the consumer/user what to actually do with the documents. The current invention aims to alleviate this disadvantage in the prior art by providing legally correct advice at an affordable price to the end customer.

It is known in the prior art that in the US consumers can file their tax statements with the IRS (In Land Revenue Service) by means of a software product such as TurboTax.

Quite clearly computerised tools that enable the public to prosecute simple matters by themselves especially internationally over a range of jurisdictions or substantive legal fields, would greatly help the public.

SUMMARY

It is an objective of the invention to provide a cloud based software solution with which individuals can prosecute their simple legal matters economically and correctly without the expensive help of an attorney.

It is one objective of the invention to help the inventors/organizations to file the patent application/documents through the cloud system integrated with the PTO/government offices in order to save money and without the help of attorney/third parties.

A computer system in accordance with the invention, comprising at least one server computer and at least one terminal device, and user data is stored or entered on the terminal device and/or server computer is characterised in that, a user of the terminal device has an official or business matter with a governmental or civil authority, the computer system is configured to provide at least one electronic form or at least one letter template required to carry out the official or business matter with the authority to the user, the said computer system is configured to carry out or provide forms to carry out at least one official or business matter with a plurality of authorities.

A computer software program in accordance with the invention stored on at least one memory medium, on at least one server computer and/or at least one terminal device, and user data is stored or entered on the terminal device and/or server computer characterised in that, a user of the terminal device has an official or business matter with a governmental or civil authority, the computer software program is configured to provide at least one electronic form or at least one letter template required to carry out the official or business matter with the authority to the user, the said computer software program is configured to carry out or provide forms to carry out at least one official or business matter with a plurality of authorities.

A prosecution method in accordance with the invention comprises at least one server computer and at least one terminal device, and user data is stored or entered on the terminal device and/or server computer and characterised in that, a user of the terminal device has an official or business matter with a governmental or civil authority, the computer system provides at least one electronic form or at least one letter template required to carry out the official or business matter with the authority to the user, the said computer system carries out or provides forms to carry out at least one official or business matter with a plurality of authorities.

In addition, and with reference to the aforementioned advantage accruing embodiments, the best mode of this invention is considered to be cloud based Internet access to document filing services that allows the user to file documents to multiple authorities, based on computerised attorney instructions without actually hiring an attorney.

In the best mode of the invention a cloud storage system is integrated with the PTO Office/civil government offices via a server network and that incorporates all or most of the functions of a filing system, by using the data and functions already available in the social network profile or cloud storage account of the user. Further, in the best mode, the server system is connected to a plurality of government offices in different countries, and the legal matters in different countries are arranged into user and legal matter specific dockets. In the best mode, the user can benefit from the "inter-docket synergy" that exists in having all documents and data arranged into a docket system where data can be copied from one docket to another docket where it is needed to progress a matter. For example, if the user is a EU citizen, and files for a Visa to India the photo of the user from the docket "user_visa_india" could also be used in applying for a US visa. In this scenario, when the user would establish the docket "US_user_visa_application" the inventive server system could transport personal data, and photos from the "user_visa_india" docket automatically, and the US visa application would almost be ready by the mere establishment of the docket "US_user_visa_application". The user would then inspect and complete the auto-filled US visa application and file it electronically via the cloud based server system with US authorities. The progress of both visa applications would be tracked simultaneously by the inventive cloud server system. In the best mode, there would optionally be a US or Indian attorney on standby to observe dockets that experience error situations. Similarly, an attorney on standby could be used to file those documents in a jurisdiction that can only be filed by an attorney in that jurisdiction.

Some of the embodiments are described in the dependent claims.

DETAILED DESCRIPTION OF EMBODIMENTS

Figure 1:
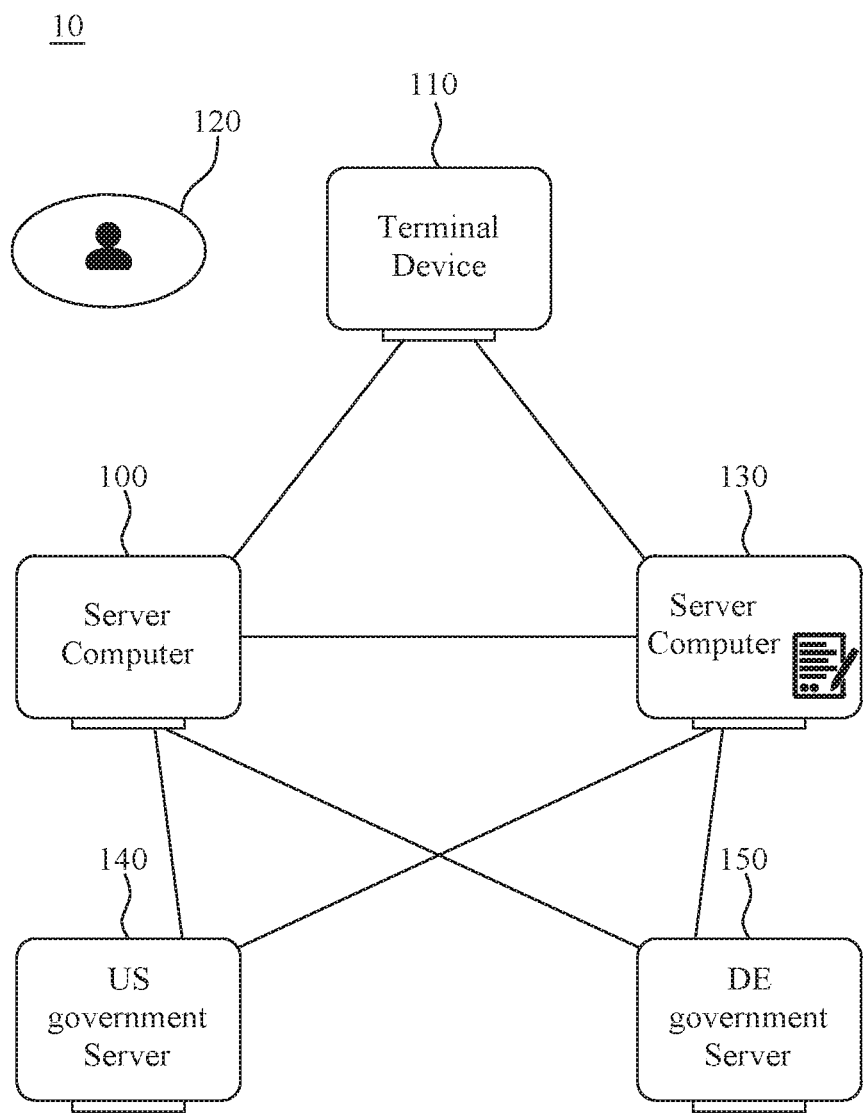
FIG. 1 demonstrates an embodiment 10 of the filing and docketing system as a block diagram.

FIG. 1 demonstrates an embodiment 10 of the filing system as a block diagram.

In FIG. 1 there are two network server computers 100, 130 which may include microprocessor, memory, data storage, an input-output device, usually made up of a monitor (display), keyboard, mouse and/or touch screen. However, typically there is more than one computer server in use at one time, so some computers may only incorporate the computer itself, and no screen and no keyboard. These types of computers are typically stored in server farms, which are used to realise the cloud network of the invention. The cloud network can be purchased as a separate solution from known vendors such as Microsoft and Amazon and HP (Hewlett-Packard). The server computers 100, 130 typically run Unix, Microsoft, iOS, Linux or any other known operating system, and comprise typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using flash as the backbone storage for the cloud network is preferred despite its high cost due to the reduced latency that is required and/or preferred for the electronic prosecution and filing system.

FIG. 1 also shows a terminal device 110, which may be a PC-computer or an Apple Macintosh-computer. Alternatively, the terminal device may be a mobile subscriber terminal 110, typically a smartphone and/or a tablet that is used to log on to, and to operate the cloud account of the user. The mobile subscriber terminal is typically a mobile smartphone, such as iOS, Android or a Windows Phone smartphone in accordance with the invention.

However, it is also possible that the subscriber terminal 110 is a mobile station, mobile phone or a computer, such as a PC-computer, Apple Macintosh-computer, PDA-device (Personal Digital Assistant), or UMTS- (Universal Mobile Telecommunication System), GSM- (Global System for Mobile Telecommunications), WAP- (Wireless Application Protocol), Teldesic-, Inmarsat-, Iridium-, GPRS- (General Packet Radio Service), CDMA- (Code Division Multiple Access), GPS- (Global Positioning System), 3G-, 4G-, Bluetooth-, WLAN- (Wireless Local Area Network), Wi-Fi and/or WCDMA (Wideband Code Division Multiple Access)-compliant mobile station. Sometimes in some embodiments the subscriber terminal 110 is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

FIG. 1 also shows the applicant/user 120 who is typically a natural person or the representative of the legal entity that is the user or party in the inventive cloud prosecution and filing system.

FIG. 1 also shows the server computer 130 which is configured to carry out or provide forms to carry out at least one official or business matter with a plurality of authorities 140, 150, such as the US or German government or the like.

Suppose the user is a person who splits his time with the US and Germany. The inventive cloud system 100, 130 is connected to the tax authorities 140, 150, preferably electronically, of both countries.

Firstly, the cloud system 100, 130 can determine where the user should be taxed in the first place. This can be established, for example by the mobile station following the location of the user and determining the number of days spent in US and the number of days spent in Germany. To collect this and other user data, there is preferably an app installed on the mobile station that records the location of the user. If the user is a legal resident in both countries, and the system calculates that 220 days were spent in the US, the cloud system will prepare the tax report to the US and facilitate the electronic filing to the server 140, which may be a IRS (Inland Revenue Service) computer. Optionally, the cloud server 100, 130 may also fill a form or draft a letter explaining that the user spent 220 days in the US and no taxes are due to Germany, and the filing of this letter/form may be facilitated to the German tax authorities via their computer 150.

The cloud server 100, 130 has been preferably preprogrammed with all the tax forms, tax laws, tax agreements between countries. The user can enter or make available a lot of his personal information via the Terminal Device 110. The user can for example connect the cloud service to his bank account or bank accounts or credit card accounts to determine income, determine tax deductions and the like. For one matter between the user and one government, the cloud system typically establishes a docket, which is the atomic unit of a matter involving all the dealings in the matter in a private practice law firm. For example, taxes in 2015 in the US could be one docket, and taxes in Germany in 2015 could be another docket. Once the user has entered some information into one docket, e.g. the number of children/dependents, this information is preferably automatically used by all other dockets in the future. This way the cloud service 100, 130 can present the user with pre-filled forms that require the minimum work from the user, and are based on actual verifiable data and user input. This way, as there is more user data in the cloud system 100, 130 and more past dockets the legacy data from the dockets and the ever more accurate user data cause the more routine administrative matters to become ever more automated and easier for the user to manage. This applies fundamentally to almost all matters. For example, a residence permit application may ask the house address and the number of children, which both could be used in filing tax statements. Therefore, the automatic inter-docket transport of data is a major inventive step that brings about great consumer benefits.

In addition to savings and payment account data the user can of course connect or make available also the data in his investment account into the cloud system 100, 130. Preferably, the cloud server system is also programmed to maximise the advantages of the individual against the governments. Many times there is a tax deduction to which the person could be entitled to, but as the user does not know about it, he forgets to claim it. It is a well known fact that governments do not provide tax minimisation consultancy to its citizens, but preferably the inventive cloud system 100, 130 does. Preferably the inventive cloud system applies automatically any tax deduction that is available to the user to include in his tax statements. Preferably, any tax statements are also stored into the relevant docket on the cloud system 100, 130.

When the tax decision is issued, the decision is preferably received electronically by the cloud system 100, 130. In some embodiments the correctness of the decision is automatically inspected by the cloud system 100, 130. If parts of the decision are found to have been erroneously made, the cloud system will issue a warning to the user, or automatically draft an appeal, which appeals the incorrect parts of the decision.

To do this the inventive cloud system typically calculates an anticipated outcome of the decision. Typically, if the actual outcome is worse than the anticipated outcome, the system determines the difference in the anticipated and actual outcomes. Then the inventive cloud system typically searches for decisions from other cases that are similar to explain the difference and provides these cases as reference points to the user.

If the actual outcome is the same or better than the anticipated outcome, in some embodiments the inventive cloud system merely receives, archives and follows the decision as it might not be in the user's interest to appeal the decision.

The cloud system 100, 130 can also automatically present legislation or government guidelines to which it bases its recommendations. This reference material could be supplemented by proprietary instructions, written for example by an attorney who knows the relevant field, and the proprietary instructions could be shown to the user for reference. In some embodiments, the user subscribes to this service on a monthly basis.

Preferably the cloud system is continuously being kept up to date, so that when laws or regulations or guidelines change, the cloud system will always apply the new and correct law so that the individual interest of the user is maximised against the government and/or governments.

Any features of embodiment 10 may be readily combined or permuted with any of the other embodiments 20, 30, 40, 50, 60 and/or 70 in accordance with the invention.

Figure 2:
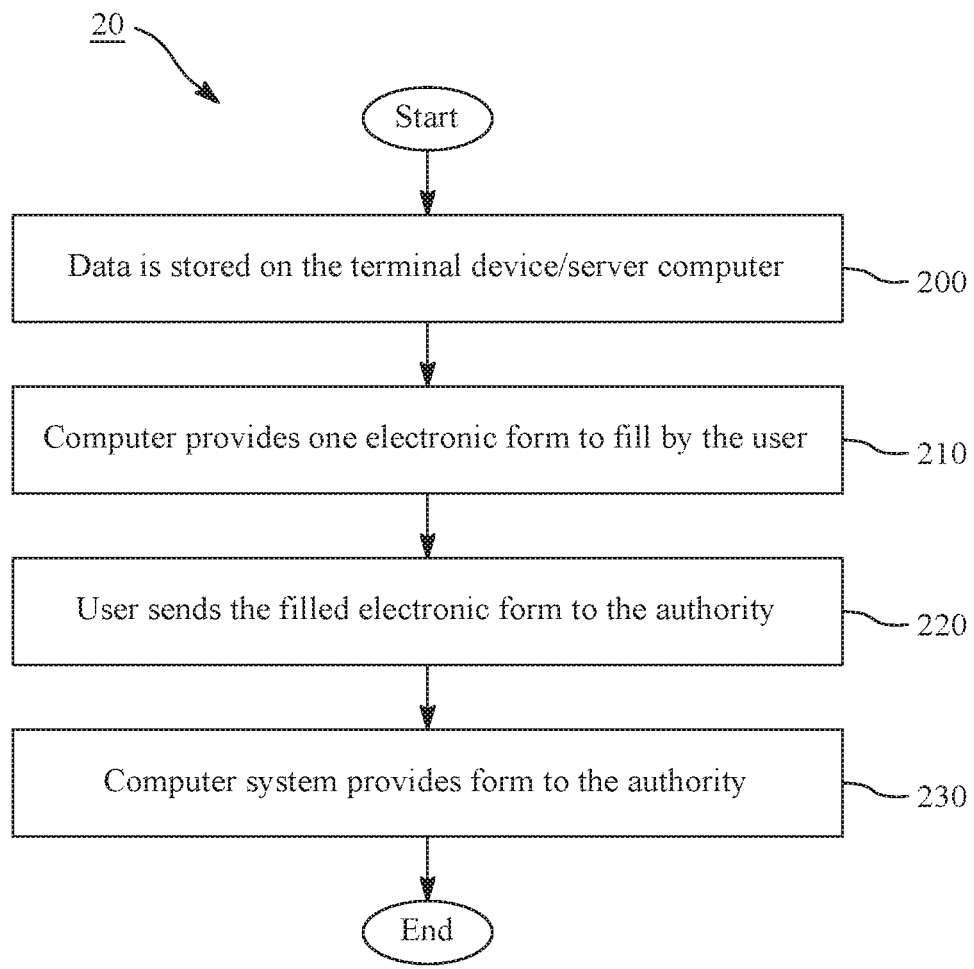
FIG. 2 demonstrates an embodiment 20 of a method of filing and docketing documents in accordance with the invention as a flow diagram.

FIG. 2 demonstrates a basic embodiment 20 of a method of preparing and filing documents in accordance with the invention as a flow diagram.

In phase 200 data is stored on the terminal device and/or the cloud system 100, 130. Primarily the data falls into two groups, 1) data that is entered by the user that is new, or an update to existing older data and 2) data from existing and past dockets stored in the cloud system 100, 130.

When the user begins to prosecute or handle a new matter, typically a docket is established for that matter, and the cloud system provides at least one, preferably all the necessary forms, preferably as pre-filled, to the user in phase 210.

The cloud system 100, 130 can prefill details such as user details that may include any of the following: Name, address, phone number, social security number, received salary during the year, received capital gains during the year, credit score, dependents, debts, assets, illnesses, medications, prescriptions and the like. In some embodiments of the invention, all or some parts of this data are retrieved from a social network user profile of the user.

Preferably only that data that is required for the processing of the matter at hand, is transported to the docket and entered pre-filled on the forms. In addition to forms, the cloud system may generate a draft letter with an automatically generated letter head, address entries, headings and the like in accordance with the invention.

By entering any argumentation or information that is not included in the forms on a standardised letter that the cloud system 100, 130 has already tested with the authority on a number of cases, the user can focus on the essential, i.e. what he needs to say, rather than spending time on managing formalities that are many times identical with every user, citizen, and/or applicant that encounters the legal situation of the docket in question.

Also one interesting situation arises when the user interacts with a foreign government. With many governments, many matters conducted by foreign people or foreign companies are handled by attorneys of that country. However, in many countries Pro Se presentation is available, but due to the bureaucratic difficulty of managing the legal process, or the difficulty in setting up Pro Se presentation, people and companies do not engage in Pro-Se prosecution, even when the matter is as simple as paying a fee, or registering a change of name or the like.

However, the inventive cloud system can establish a Pro Se presentation on behalf and to the user, and as the simple matters require very little input from the user beyond those entries already pre-filled by the cloud system 100, 130, using the invention as a Pro Se prosecution tool in a foreign country is very efficient and saves a lot of cost.

In phase 220 the user sends the form to the authority typically, electronically. The user simply approves the at least one form and/or letter and/or document for sending, and the cloud system 100, 130, interfaces with the electronic filing system of the relevant authority and files the submission. In some embodiments the inventive cloud system delivers documents to the authorities by conventional means such as fax, email, standard mail, courier service or the like.

In phase 230 the cloud system 100, 130 provides the submission to the authority. Preferably the cloud system 100, 130 also captures a filing receipt and stores it in the docket for later verification, just in case should the authority try to dispute the actual filing or correctness of the filed submission.

Also it should be noted that filed documents in one docket, e.g. a criminal report reporting a stolen bicycle, are evidence in another docket, e.g. an insurance claim requiring compensation from an insurance company towards the replacement of the stolen bicycle. Therefore, the ready submitted documents of one docket can become the input data of phase 200 in another docket.

Preferably the aforementioned holds true for documents received from the authorities as well. For example, in the field of patents, a European Search report and the reference publications received into one docket, become automatically the input data of an Information Disclosure Statement into the USPTO in the other US docket of the same matter, the matter being a patent application concerning an invention in this case.

Any features of embodiment 20 may be readily combined or permuted with any of the other embodiments 10, 30, 40, 50, 60 and/or 70 in accordance with the invention.

Figure 3:
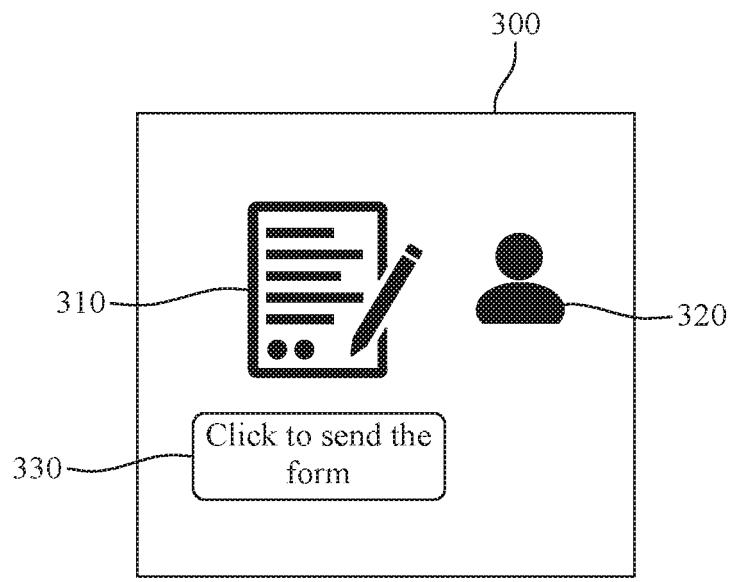
FIG. 3 demonstrates an embodiment 30 of the software programme product in accordance with the invention as a screen shot diagram.
Figure 3:
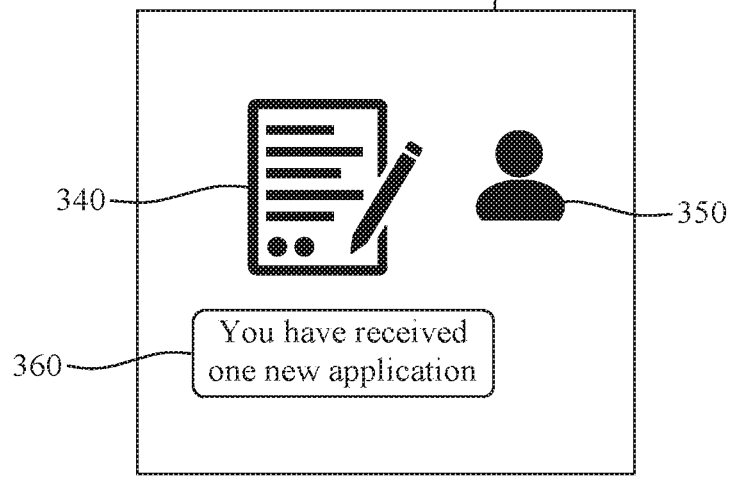

FIG. 3 demonstrates an embodiment 30 of the software programme product in accordance with the invention as a screen shot diagram. Screen 300 shows the end-user view, which is what consumers and small business representatives use. The authority view is shown in 330.

Here the invention is applied to filing a European Patent Application via the Patent Co-operation Treaty. For example, the docket has been established for an invention titled "screwdriver" and the applicant of the patent application is the fictitious Bolt Oy. Now, as the docket is established, all the available valid data about Bolt Oy required is automatically pre-filled into the at least one form 310. This includes user data and data that is found via an inter-docket check from the Bolt Oy user 320 account. The use of the account is typically authorised to one or more select people whose photo(s) may appear on the screen as shown.

The cloud system 100, 130 is programmed with the entire European Patent Convention EPC and Guidelines, so the system can pre-fill any required EPO form and/or generate draft letters, which when submitted could establish legal acts necessary to progress the application. The user 320 can file the European Patent Application via a WWW interface to the cloud system 100, 130, by pressing icon 330 and the cloud system generates the letter or form for request for examination, payment of designation fees, intention to proceed with the application, inclusion of search results from the priority application docket, voluntary IDS from the USPTO, Pro Se representation and the like. In one use case, the user only needs to upload the text and figures as a M-S Word/PDF document and credit card details, i.e. only the actual invention and the payment. The cloud system 100, 130 autocompletes all actions needed for valid filing and pays, typically the minimum, of fees from the credit card for the Examination to begin, and establishes the user as a Pro Se Applicant without an attorney.

At the authority end, the user 350 who is e.g. an employee of the European Patent Office sees the new application having arrived. This can be communicated e.g. in a screen icon 360. The contents of the forms submitted in 310 can be shown in section 340 in accordance with the invention.

There are alternatives as to how the Applicant-Authority relationship is established by the cloud system 100, 130. The cloud system 100, 130 that typically has human employees may establish a smartcard, or other form of identification, for the Applicant Bolt Oy, and host the smartcard on behalf of the applicant.

Alternatively, the cloud system 100, 130 operates a smart card itself for logging into the EPO systems. In the corresponding case in the USPTO, the cloud system could make use of a customer number only in case of a non-attorney entitled client, or an attorney registration number for establishing a certificate provided an US attorney authorised to practice before the USPTO was employed by the inventive cloud system 100, 130.

In some embodiments, the cloud system co-ordinates the electronic Pro-Se filing system on behalf of the Applicant(s) so that they may file and prosecute their inventions via a WWW interface interacting electronically with any Patent Office or plurality of Patent offices allowing Pro Se representation.

In one alternative the inventive cloud system 100, 130 employs an attorney, who files applications under his name with a cover letter or form or the like attesting that his client continues independently as a Pro Se party, and that the attorney acts only to establish the communication connection between the Office and the Applicant. Subsequently the Offoce and the Applicant may continue communication via either the cloud system or via another communication channel.

In some other embodiments the cloud system 100, 130 acts as a tool for attorneys with which they can offer service to clients, who want to minimise the use of the attorney, but still prefer an attorney supervised case where the attorney can be consulted on an as needed basis.

The relevant authority, e.g. the European Patent Office, may electronically send any follow on decisions with regard to the application filed, and the cloud system 100, 130 will receive and route said decisions/communications to the relevant docket in the user account of the user, the fictitious Bolt Oy in this case.

Any fees paid to the authority could be deducted from the credit card, or account of the user held with the cloud system 100, 130. The cloud system could then utilise the most efficient way of paying the authority, e.g. via Deposit Account arrangements or other mass scale payment arrangements in accordance with the invention.

Any features of embodiment 30 may be readily combined or permuted with any of the other embodiments 10, 20, 40, 50, 60 and/or 70 in accordance with the invention.

Figure 4:
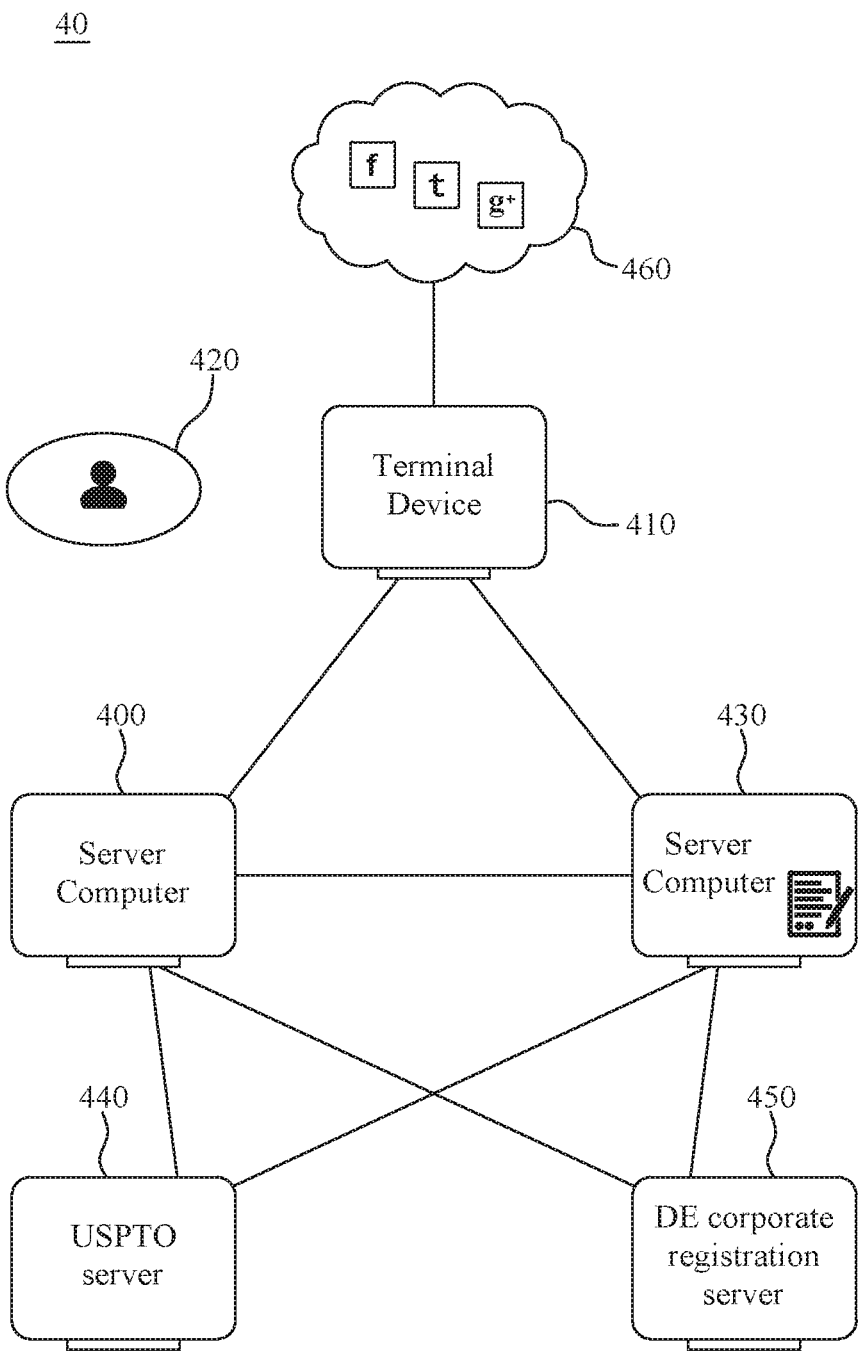
FIG. 4 demonstrates an embodiment 40 of an elaborate cloud based filing and docketing system in accordance with the invention as a block diagram.

FIG. 4 demonstrates an embodiment 40 of a more elaborate globalized cloud based filing and docketing system in accordance with the invention as a block diagram.

FIG. 4 shows a more elaborate embodiment with a plurality of authorities from multiple different countries and different areas of government, and/or different areas of civil government. The cloud system 400, 430 is connected with the US Patent Office Server 440 and the German corporate registration server 450. Quite clearly, patents and corporate registrations are different areas of government governed by different laws.

As many present day users have most of their personal data in the cloud, the inventive system is configured to get it directly from there. For example, said user data can be configured to be imported from a social network (410), which may be for example Google+, Facebook, Instagram, LinkedIn, Twitter or the like. Either the terminal device 410 or the cloud system 400, 430 may access user data from the social network 410 to assist in the automatic preparation of legal documents in the cloud system.

Typically, the cloud system 400, 430 is configured to store a payment method, and/or configured to make payments of fees (420) related to carrying out the said official or business matter to at least one authority on behalf of the user. The cloud system is configured to facilitate the electronic filing of documents to at least one said authority. In a preferred embodiment, the user can prepare and file the legal document and pay the associated fees with the legal activity, and store all correspondence electronically, preferably in a docket for later retrieval, all in one session on the cloud system 400, 430.

The inventive cloud system 400, 430 is accessible via a WWW interface or a mobile app interface. Further, when the authority issues a decision with regard to the legal filing, in a preferred embodiment, the cloud system 400, 430 moves the decision documents automatically into the relevant docket to which that decision belongs. Further, the cloud system 400, 430, may automatically generate a response letter template, establish time limits into a calendar with warnings notifying the user that a response will be due by the time limit.

In some embodiments the said cloud system is configured to provide the first filing of documents (430, 450) by an attorney, and then establish Pro Se representation to the user (440). This could be done so, that an attorney who works for the operator of the cloud system 400, 430 files the documents and begins the processing of the legal matter. After the processing of the legal matter has begun, this attorney establishes a Pro Se relationship for the client, removing himself as the attorney on the case and directing correspondence to the party himself or his selected representative.

In some embodiments, the said cloud system 400, 430 is configured to provide an electronic correspondence address, and/or a mail address in the jurisdiction of the at least one authority for the correspondence with the at least one authority. Some authorities have a rule that they only post or communicate decisions to an address within the jurisdiction or to a set of people linked to that jurisdiction, e.g. attorneys licensed to represent in that country. Therefore, it is in accordance with the invention that the cloud system 400, 430 establishes these criteria, and the broader global client base uses these established correspondence channels for legal communication. In some embodiments the cloud system provides automatic and/or optional machine and/or human language translation of incoming documents, typically to the language used by the user.

In some embodiments the said cloud system 400, 430 is configured to provide automatic, semiautomatic, and/or manual electronic archiving of correspondence and documents, optionally by associating a docket number with a matter.

As is highlighted below, the inter-docket checks and data transport of the invention have advantages also in this environment. The cloud system can be configured so that when a new matter is begun, e.g. a new docket is established, the cloud system 400, 430 will search the user data and all the other existing dockets for any data entries that are already there, and enter them automatically onto the forms or letter templates that were deemed necessary or relevant for carrying out the legal matter. These pre-filled forms and letter templates are then retrieved to the user and presented to the user in the new docket.

In addition to retrieving the relevant documents and preparing the documents up to as ready point as possible, the cloud system 400, 430 can show advice on how the user should complete remaining parts of the documents to process the legal matter. The advice can take the form of layman explanation, for example: "You have options A, B, C, most of the users in your situation take C, because . . . ".

Alternatively, the advice can be based on macro statistics of all cases and their outcomes that have been programmed into the cloud system 400, 430, for example with the format: "There were 5 cases between 1996-2016 in this category, all of which the claimant lost. You have a macro statistical estimated prospect of success of 0%".

The legal advice and statistic advice is preferably displayed to the user as early as possible, to facilitate early decision making of the user on his matter with all the information available.

Any features of embodiment 40 may be readily combined or permuted with any of the other embodiments 10, 20, 30, 50, 60 and/or 70 in accordance with the invention.

Figure 5:
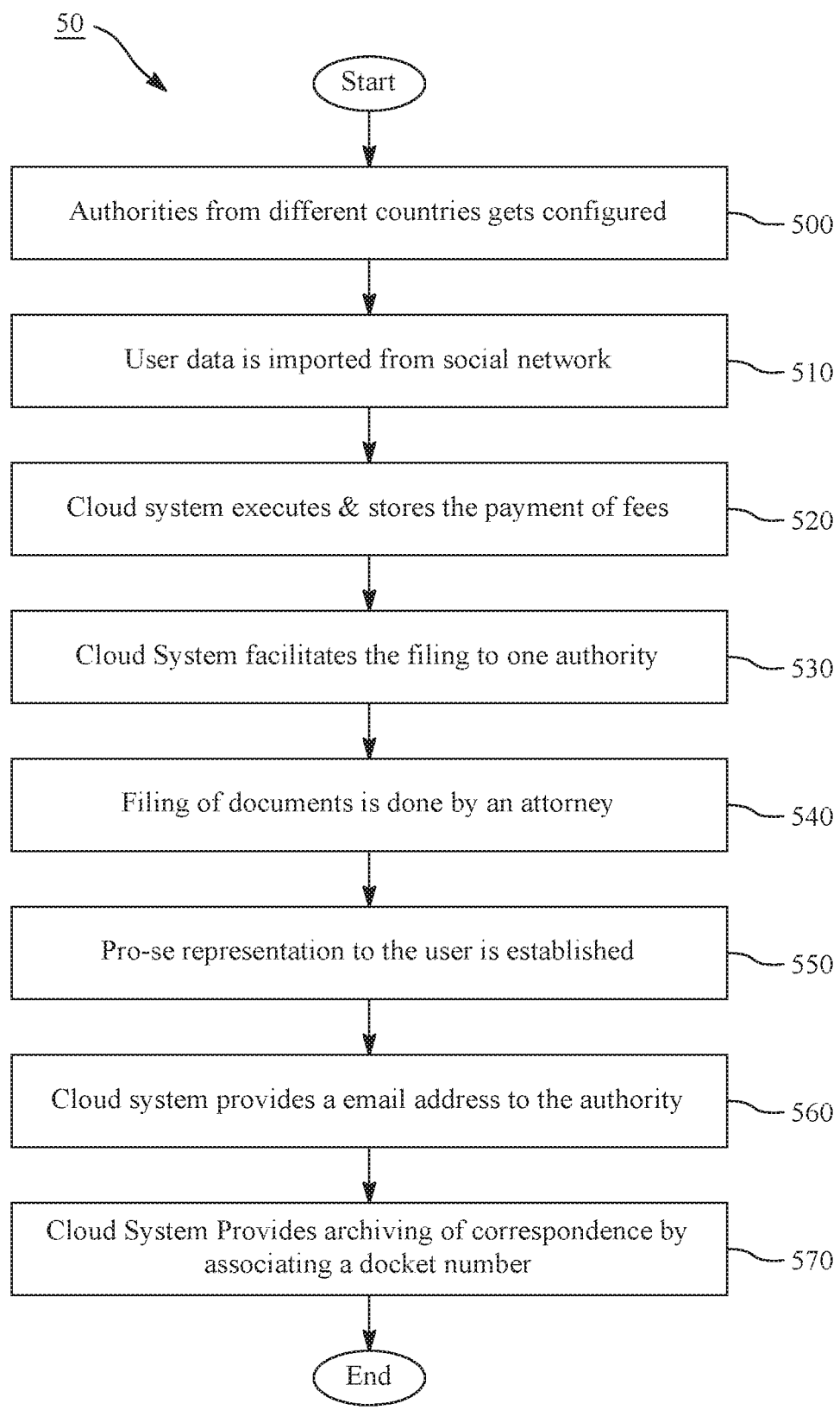
FIG. 5 demonstrates an embodiment 50 of an elaborate cloud based method of filing and docketing in accordance with the invention as a flow diagram.

FIG. 5 demonstrates an embodiment 50 of a more elaborate method of setting up a filing and docketing system in accordance with the invention as a flow diagram.

In phase 500 the plurality of authorities comprises authorities from multiple different countries, different areas of government, and/or different areas of civil government. Presently, most of these authorities can accept documents electronically, albeit the software system used for filing and communicating documents is different, for example the USPTO uses PAIR, EPO uses epoline, and e.g. the Finnish tax officials use their own electronic filing system, and the US IRS uses their own respective filing system. Preferably the cloud system 400, 430 is configured to interface with all these electronic filing systems and many other filing systems. In fact, it is one objective of the invention to to have all governments accessible via the WWW or the Internet to the globalised consumer.

In phase 510 user data is imported from a social network (510), typically from the user profile of the user from Facebook or LinkedIn for example. This feature is optional, of course the users can enter their details with e.g. a keyboard by typing. Alternatively, user data could be imported from SAP or the like enterprise resource management software.

With user data, a new matter can be opened and a docket established for the matter. Once the matter and the docket are established and documents are ready or in preparation as explained earlier, it becomes important to assess the fees. In phase 520 the cloud system calculates the official fees needed to carry out the legal activity, pays them and stores the receipt of payment into the docket. Payment can be made by any standard payment method as explained before.

When the fees have been paid, the cloud system in phase 530 facilitates the filing of the documents to the authority concerned in the docket and encloses also the receipt of the payment into the submission.

If the filing can only legally be done by an attorney, or filing by an attorney is the most practical option, the filing is done by an attorney in phase 540, who typically is registered with the authority, for example with a registration number. However, even in the aforementioned cases the user may want to establish self-representation, and accordingly Pro Se representation of the user is established in phase 550. In some embodiments this is established by the user filing a Power of Attorney authorising himself, but with most of the authorities this is not necessary.

In phase 560 the said cloud system provides an electronic correspondence address, and/or a mail address in the jurisdiction of the at least one authority for the correspondence with at least one said authority. This way the cloud system automatically establishes a virtual address for the user, who may have no address in that country or jurisdiction. This feature greatly alleviates the need for foreign parties to engage an attorney. Many foreign people are pressured into getting an attorney, simply because they have no address in the country.

In some countries the authorities use a language that is foreign to the user. In some embodiments the cloud system 400, 430 translates the incoming documents to the language of the user. The language translation can be executed by a machine, i.e. providing a machine translation, or a workflow with human translators can be established in the cloud system, so that e.g. a human translator will translate any foreign documents within 2 weeks from arrival into the docket. Alternatively the human translator can be told to inspect and correct and finalise machine translations. Also in some embodiments, for example a semantic and/or number search for the publication of the same document in another language can be executed automatically, as this can avoid the need of a translation. E.g. if the document is a Japanese patent publication, a US patent publication from the same patent family is likely to void the need for an English translation.

When the documents have been filed the cloud system provides automatic, semiautomatic, and/or manual electronic archiving of correspondence and documents, optionally but preferably by associating a docket number with a matter (570). Now the matter has been validly handled with a minimum of attorney time spent, and everything needed has been archived into the docket. When the decision or response from the authority comes, the cloud system can prepare a response template with the necessary forms, prefilled forms, prefilled letter templates, reference documents from the docket or other dockets and possibly some computer generated analysis of why the decision/response of the authority is what it is.

It should be noted that the invention is not only suitable for Pro Se parties. In fact, one of the best modes of the invention is as an attorney tool. When the attorney uses the inventive cloud system, he can focus all his efforts into matter-resolving activity, and spend the minimum on bureaucratic back office work, as the cloud system does that automatically.

Any features of embodiment 50 may be readily combined or permuted with any of the other embodiments 10, 20, 30, 40 and/or 60, 70 in accordance with the invention.

Figure 6:
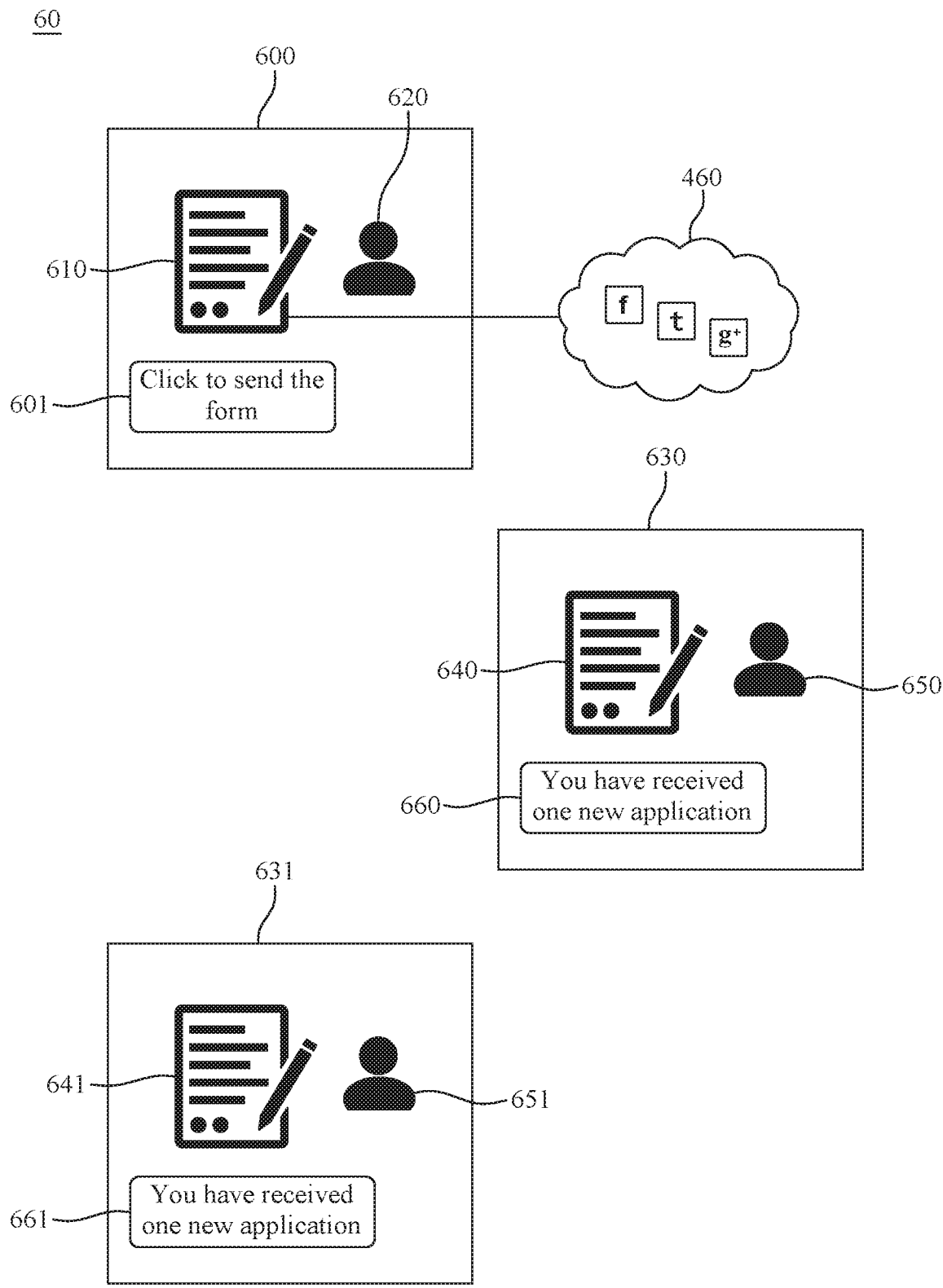
FIG. 6 demonstrates an embodiment 60 of an elaborate cloud software programme product in accordance with the invention as a screen shot diagram.

FIG. 6 demonstrates an embodiment 60 of a more elaborate software programme product in accordance with the invention as a screen shot diagram.

Typically, the plurality of authorities is configured to comprise authorities from multiple different countries, different areas of government, and/or different areas of civil government. User data is configured to be imported from a social network (460).

Said cloud system software is configured to facilitate the electronic filing of documents to at least one said authority, two in this case 630, 631. The cloud system software is configured to store a payment method, and/or configured to make payments of fees related to carrying out the said official or business matter to at least one authority 630, 631.

In some embodiments the said cloud software system is configured to provide the first filing of documents by an attorney, and then establish pro se representation to the user 620. In that event, the user 620 sees himself represented by an attorney, and the officials 650, 651, see the case and the documents coming under the representation of the said attorney at first.

Also the cloud software may be configured to provide an electronic correspondence address, and/or a mail address in the jurisdiction of the at least one authority for the correspondence with at least one said authority, and optionally translations of documents that are in a foreign language. For example, if the form 640 is in Chinese and the authority 630 and the official 650 are Chinese, the cloud system can translate the Chinese documents in to English as explained before, so that the user 620 can prosecute his docket in English. Vice versa all English filed documents could be translated to Chinese when they are filed with authority 630 by the cloud system.

The cloud software system is configured to provide automatic, semiautomatic, and/or manual electronic archiving of correspondence and documents, optionally by associating a docket number with a matter. Now suppose the authority 631 is a US authority. The documents in the English language created in the prosecution with the Chinese authority could still be used in the US docket with authority 631, even though they were not filed (the Chinese translations were).

How does the cloud system retrieve the correct forms? Every legal situation has been coded into the cloud system, with the appropriate response documents that apply to that legal situation. When there is a choice over response involving different document or form sets, the different sets of forms, and the choice is of course offered to the user.

How does the cloud system pre-fill or autofill forms and/or letter templates from user data or other present or past dockets? This is done with search.

When for example "name" appears on a form that has been retrieved, the cloud system will look up the name from the user data, e.g. John Smith.

When a document such as US123456B1 appears in docket and the cloud system recognises that this document has not been submitted to the USPTO in the corresponding US case, the cloud system will automatically determine that an Information Disclosure statement is required, fill the forms, copy and append the document from the sister docket and present the forms and the reference documents ready for filing to the USPTO to the user. The user just presses the button 601 to send the filing documents and the legal action has been completed and the filed documents can be auto-archived into the docket. The activity that involved several emails and two attorney charges, typically about 200 euros or 200 USD each, has been completed by the applicant with very little cost and very little time spent.

Any features of embodiment 60 may be readily combined or permuted with any of the other embodiments 10, 20, 30, 40, 50 and/or 70 in accordance with the invention.

Figure 7:
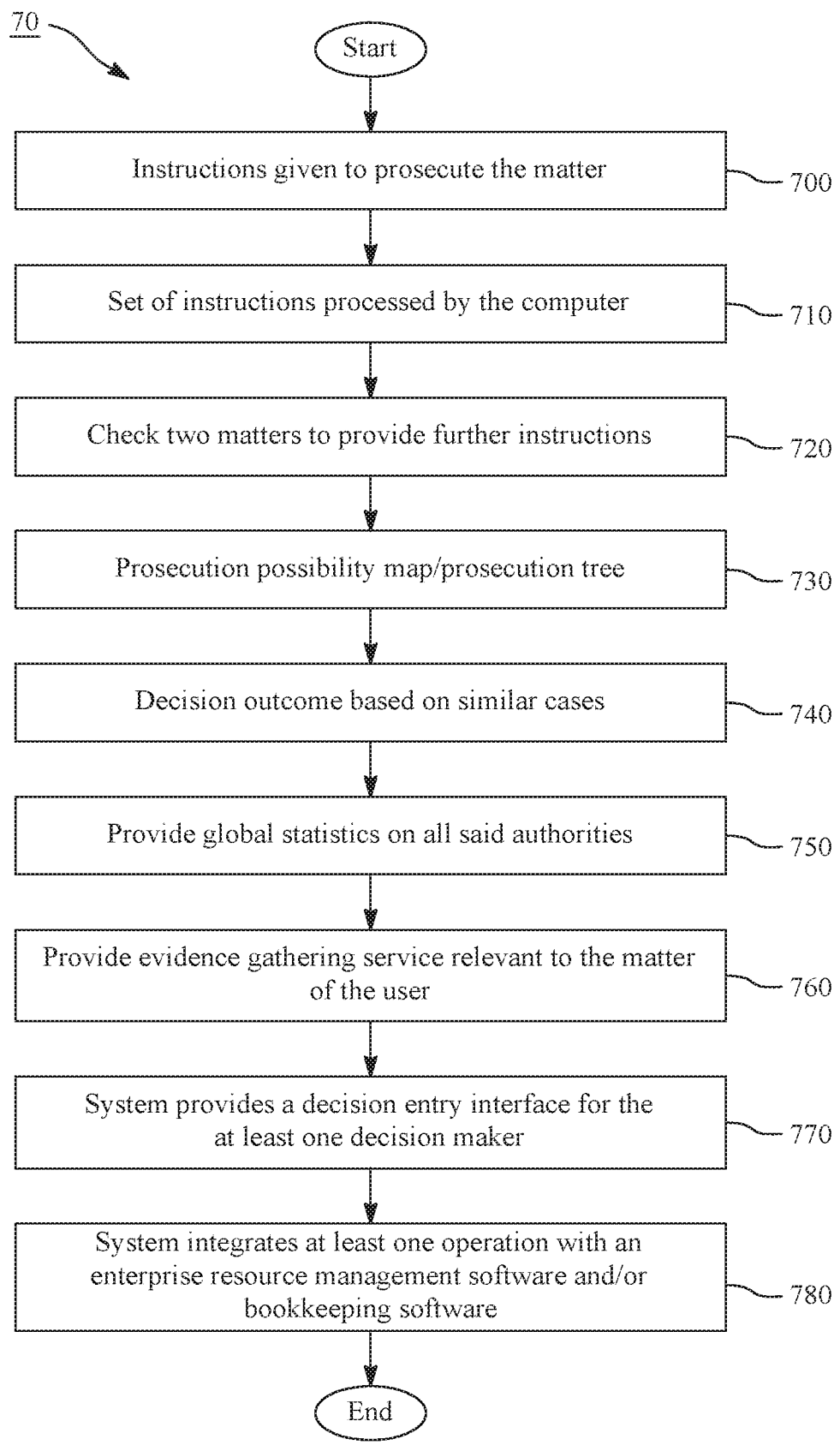
FIG. 7 demonstrates an embodiment 70 of a method to provide facilities to the user by the computer system in accordance with the invention as a flow diagram.

FIG. 7 demonstrates an embodiment 70 of a method to provide prosecution guidance and support to the user with the cloud system in accordance with the invention as a flow diagram.

The said cloud system may provide many facilities and advice to the user of the cloud system, which all help the user to eliminate unnecessary clerical work, but also provide advice that allow better informed substantive decisions.

In phase 700 instructions on how to prosecute the matter of the user based on law and/or governmental instructions are provided by the cloud system. The instructions are typically displayed via a WWW interface or a mobile app to the user.

In phase 710 an automatic set of instructions are activated, which when carried out by the cloud system, maintains rights without any input from the user. This function of the cloud system could be called an "auto-pilot" function, because it works in some embodiments as follows:

the cloud system will pay the minimum amount of fees required to maintain all rights automatically to the relevant authority if required, the cloud system will perform the minimum required procedural steps on behalf of the user to keep all rights, or defined rights, or a set of defined rights pending, active or available.

In phase 720 the cloud system provides checks between two matters and/or dockets associated with the matters, and optionally provides further prosecution steps. One example of this is the Information Disclosure Statement process discussed earlier. An incoming reference publication to any other non-US patent application docket, is scripted to initiate the production of an IDS statement to the US authority, USPTO in this case. This is a scenario that repeats itself in many different facets of international law mutatis mutandis, and therefore this is a highly productivity enhancing feature.

In phase 730 a prosecution possibility map and/or prosecution tree as a function of time is provided and/or displayed to the user. This is a visualization of what prosecution options the user could take at what points in time and/or in response to what outcomes. The decisions that are taken in the case and the passage of time change the prosecution possibility map and/or prosecution tree, so having it produced by a cloud system maintaining the up-to-date versions of laws in a number of jurisdictions and the up-to date substantive status of the case is a great strength in the invention. It would be impossible for any individual to grasp the global legal situation completely today, so that it would be completely accurate, simply because so many changes take place in the world. As these many changes interleave with the procedural and substantive changes in the case of the client, the need for a computerised analysis to assist the attorney and client decisions becomes even more clear. The inventive cloud system 400, 430 addresses this need, with a multitude of technical features such as inter-docket checks, inter-docket evidence co-ordination, and the like. The inter-docket evidence co-ordination could involve for example the filing of evidence in jurisdiction B from a docket of the jurisdiction A, if it is clear that the witnessed facts or opinions do not change from jurisdiction A to B.

Phase 740 provides a decision outcome forecast based on global or local past statistics of similar cases, which is useful for the user in trying to determine the prospect of success for his case. The statistics can be derived from the outcomes of the past dockets in the cloud system 400, 430 and by statistical analysis of cases that were not in the cloud system. Further, published data may be searched and stored into the cloud system, and the cloud system can also purchase proprietary data into its cloud system for making it available to its subscribers/users. Even further, the cloud system 400, 430 may conduct surveys, or hire survey and/or research consultants to research new information that would be beneficial to the users of the cloud system 100, 130, 400, 430.

In phase 750 the cloud system provides global statistics on all said authorities, prosecution matters and/or even individual decision makers/officials. This feature greatly improves judicial transparency. At present in many obscure jurisdictions such as small European countries nobody knows the state of the legal or dispute resolution market because nobody collects decision statistics. When the cloud system collects and displays decision stats from different countries or different authorities or different people, the macro level attitude of the country/authority/person becomes clear, and the users, i.e. the market, is enabled to respond accordingly based on correct information. For example, there is no point in applying a patent in a country whose courts never land patent infringement verdicts, except that this might change in the future.

In phase 760 the cloud system provides evidence and/or witness gathering service relevant to the matter of the user. This may be provided by human experts that search for evidence for a fee. Engaging these experts will be more expedient with the invention, as they can be engaged by allowing them access to at least one relevant docket on the inventive cloud system 100, 130, 400, 430. However, it is also possible that semantic search is used to link matters in the docket to published documents on the Internet. For example, the cloud system 400, 430 could be configured to search for product descriptions over the Internet or technical papers over the internet automatically based on any currently pending independent claim when a patent application is prosecuted in the docket.

In phase 770 the cloud system provides a decision entry interface for the at least one decision maker. It is a well known fact that when governments implement information technology projects they sometimes do not work, and sometimes the officials do not know how to use the system. To alleviate this, it is in accordance with the invention that some governments may elect a hosted service from the cloud system of the invention. In the hosted system option, the civil servant or judge logs on to the cloud system 400, 430 to produce the decision, typically via a simple WWW interface. The civil servant or judge simply identifies himself as the decision maker to the cloud system. The previously mentioned support functions can be made available to the decision maker also by the cloud system mutatis mutandis.

In phase 780 the said cloud system integrates at least one operation with an enterprise resource management software, such as SAP, Oracle and/or bookkeeping software. For example, any legal documents archived that relate to assets of the user could be enclosed or linked to the balance sheet, or like functions.

The method phases and/or functions of embodiment 70 can be implemented in a cloud system 100, 130, 400, 430 described with FIGS. 1 and 4, i.e. described in embodiments 10 and 40. The functions of embodiment 70 can also be implemented with user interfaces described in embodiments 20, FIG. 2 and embodiments 50, FIG. 5.

Any features of embodiment 70 may be readily combined or permuted with any of the other embodiments 10, 20, 30, 40, 50 and/or 60 in accordance with the invention.

The invention has been explained above with reference to the aforementioned embodiments and several commercial and industrial advantages have been demonstrated. The methods and arrangements of the invention allow people to represent themselves against any government in any matter without the professional civil servant having an information asymmetry advantage. As the inventive cloud system knows all the laws at all the time and is continuously updated, it can provide very efficient recommendations to the user to use in his dealings with the administrations. Further, the systematic maintenance of dockets and using past docket information and user information to prepare and prefill user correspondence make it possible for a consumer to interact efficiently and legally correctly with the administration without having to pay an attorney. The invention greatly improves equality and justice in western society, as it reduces the advantages enjoyed by those people who have access to an attorney, over the majority of people who do not have access to an attorney. The invention also greatly improves productivity of individuals and businesses. Many small matters that took a month due to attorney latency can be done with the inventive cloud system in 5 minutes with a fraction of the cost.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

U.S. Pat. No. 9,195,845 B2, TRUSTED AND SECURE TECHNIQUES FOR ITEM DELIVERY AND EXECUTION, granted on Nov. 24, 2015, Ginter et al.

The invention claimed is:

1. A computer system present over a cloud network for managing preparation and processing of legal documents, the computer system comprising a server computer and a terminal device, and user data stored into or accepted through at least one of the mobile terminal device and the server computer, wherein the computer system is configured to:
provide to the user, having at least one of an official matter and a business matter with a governmental or civil authority access via a software application of user terminal device;
provide, to the user, electronic form or letter template related to the at least one of the official matter and the business matter, wherein the electronic form or letter template is provided based on coded instructions related to the at least one of official matter and business matter;
prefill the electronic form or letter template based on the user data and data identified by an inter-docket check between a present docket and past dockets;
provide, to the user, a prosecution possibility map or prosecution tree displaying what prosecution options the user could take as a function of time and/or in response to what outcomes, and/or a decision outcome forecast based on global or local past statistics of cases similar to the current case,
file the electronic form or letter electronically to at least one authority of the plurality of authorities.

2. The computer system as claimed in claim 1, wherein said user data is imported from a social network.

3. The computer system as claimed in claim 1, further being configured to provide first filing of documents by an attorney, and establish Pro Se representation for the user.

4. The computer system as claimed in claim 1, further being configured to provide a decision entry interface for a decision maker via at least one computer, and said computer system is further configured to be integrated with at least one of an enterprise resource management software and a bookkeeping software.

5. The computer system as claimed in claim 1, wherein the plurality of authorities comprise authorities belonging to at least one of multiple countries, different areas of government, and different areas of civil government.

6. The computer system as claimed in claim 1, further being configured to provide an electronic correspondence address, and a mail address in jurisdiction of the at least one authority for correspondence with at least one said authority, and optionally translating languages of incoming documents.

7. A computer program stored on at least one memory medium, on at least one of a server computer and a mobile terminal device, and user data stored on at least one of the terminal device and the server, wherein the computer program is configured to:
provide user access via the mobile terminal device application being operated by a user having at least one of an official matter and business matter with a governmental or civil authority;
provide, to the user, electronic form or letter template related to the at least one of the official matter and the business matter, wherein the electronic form or letter template is provided based on coded instructions related to the at least one of official matter and business matter;
prefill the electronic form or letter template based on the user data and data identified by an inter-docket check between a present docket and past dockets;
provide, to the user, a prosecution possibility map or prosecution tree displaying what prosecution options the user could take as a function of time and/or in response to what outcomes, and/or a decision outcome forecast based on global or local past statistics of cases similar to the current case,
file the electronic form or letter electronically to at least one authority of the plurality of authorities.

8. The computer program as claimed in claim 7, wherein said user data is imported from a social network.

9. The computer program as claimed in claim 7, further configured to provide first filing of documents by an attorney, and establish Pro Se representation for the user.

10. The computer program as claimed in claim 7, further being configured to provide a decision entry interface for a decision maker via at least one computer, and said computer software is further configured to be integrated with at least one of an enterprise resource management software and a bookkeeping software.

11. The computer program as claimed in claim 7, wherein the plurality of authorities comprise authorities belonging to at least one of multiple countries, different areas of government, and different areas of civil government.

12. The computer program as claimed in claim 7, further being configured to provide an electronic correspondence address, and a mail address in jurisdiction of the at least one authority for correspondence with at least one said authority, and optionally translating languages of incoming documents.

13. A method for managing preparation and processing of legal documents, by a computer system comprising server computer and a mobile terminal device storing user data, wherein the method comprises:
providing user access via the mobile terminal device application being operated by a user having at least one of an official matter and a business matter with a governmental or civil authority;
providing, to the user, electronic form or letter template related to the at least one of the official matter and the business matter wherein the electronic form or letter template is provided based on coded instructions related to the at least one of official matter and business matter;
prefilling the electronic form or letter template based on the user data and data identified by an inter-docket check between a present docket and past dockets;

providing, to the user, a prosecution possibility map or prosecution tree displaying what prosecution options the user could take as a function of time and/or in response to what outcomes, and/or a decision outcome forecast based on global or local past statistics of cases similar to the current case, filing the electronic form or letter to at least one authority of the plurality of authorities.

14. The method as claimed in claim 13, wherein said user data is imported from a social network.

15. The method as claimed in claim 13, further comprising providing first filing of documents by an attorney, and establish Pro Se representation for the user.

16. The method as claimed in claim 13, further comprising providing a decision entry interface for a decision maker via at least one computer and said computer system integrates at least one operation with at least one of an enterprise resource management software and a bookkeeping software.

17. The method as claimed in claim 13, wherein the plurality of authorities comprise authorities belonging to at least one of multiple countries, different areas of government, and different areas of civil government.

18. The method as claimed in claim 13, further comprising providing an electronic correspondence address, and a mail address in jurisdiction of the at least one authority for correspondence with at least one said authority, and optionally translating languages of incoming documents.

* * * * *